(12) United States Patent
Seto (10) Patent No.: US 9,711,136 B2
(45) Date of Patent: Jul. 18, 2017

(54) SPEECH RECOGNITION DEVICE AND SPEECH RECOGNITION METHOD

(71) Applicant: MITSUBISHI ELECTRIC CORPORATION, Tokyo (JP)

(72) Inventor: Yusuke Seto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/021,839

(22) PCT Filed: Nov. 20, 2013

(86) PCT No.: PCT/JP2013/081287
§ 371 (c)(1),
(2) Date: Mar. 14, 2016

(87) PCT Pub. No.: WO2015/075789
PCT Pub. Date: May 28, 2015

(65) Prior Publication Data
US 2016/0240188 A1    Aug. 18, 2016

(51) Int. Cl.
| | | |
|---|---|---|
| *G10L 15/00* | (2013.01) |
| *G10L 15/08* | (2006.01) |
| *G10L 15/06* | (2013.01) |
| *G10L 15/32* | (2013.01) |
| *G06F 17/27* | (2006.01) |
| *G10L 15/02* | (2006.01) |
| *G10L 25/84* | (2013.01) |
| *G10L 25/51* | (2013.01) |

(52) U.S. Cl.
CPC ........ *G10L 15/005* (2013.01); *G06F 17/2735* (2013.01); *G10L 15/02* (2013.01); *G10L 15/06* (2013.01); *G10L 15/32* (2013.01); *G10L 25/84* (2013.01); *G10L 25/51* (2013.01)

(58) Field of Classification Search
CPC .............................. G10L 15/005; G10L 15/06
See application file for complete search history.

(56) References Cited

U.S. PATENT DOCUMENTS 4,531,228 A * 7/1985 Noso ........................ G10L 15/20
704/275
4,628,529 A * 12/1986 Borth .................. G10L 21/0208
381/317

(Continued)

FOREIGN PATENT DOCUMENTS

| JP | 6-073800 U | 10/1994 |
| JP | 7-230294 A | 8/1995 |

(Continued)

*Primary Examiner* — Brian Albertalli
(74) *Attorney, Agent, or Firm* — Birch, Stewart, Kolasch & Birch, LLP (57) ABSTRACT

A speech acquisition unit 1 acquires an original speech uttered freely by a user. A speech data processing unit 7 processes an original speech signal to generate a processed speech signal. An acoustic model switching unit 4 determines one acoustic model from among a plurality of acoustic models 3-1 to 3-x, based on a recognition score for each language in which a speech recognition unit 5 performs a recognition process on time series data on an acoustic feature of the processed speech signal to be calculated by using the acoustic models 3-1 to 3-x for individual languages.

10 Claims, 6 Drawing Sheets

(56) References Cited

U.S. PATENT DOCUMENTS

| | | | |
|---|---|---|---|
| 5,805,771 A * | 9/1998 | Muthusamy | G10L 15/005 704/231 |
| 2003/0191639 A1 * | 10/2003 | Mazza | G10L 15/183 704/231 |
| 2004/0039570 A1 * | 2/2004 | Harengel | G10L 13/08 704/232 |
| 2004/0088163 A1 * | 5/2004 | Schalkwyk | G10L 15/187 704/251 |
| 2005/0197835 A1 * | 9/2005 | Reinhard | G10L 15/187 704/249 |
| 2005/0197837 A1 * | 9/2005 | Suontausta | G10L 15/005 704/260 |
| 2006/0020463 A1 * | 1/2006 | Reich | G10L 15/187 704/257 |
| 2007/0124147 A1 * | 5/2007 | Gopinath | G10L 15/19 704/257 |
| 2007/0288241 A1 * | 12/2007 | Cross | G10L 15/06 704/270.1 |
| 2007/0294082 A1 * | 12/2007 | Jouvet | G10L 15/005 704/231 |
| 2010/0131262 A1 * | 5/2010 | Gruhn | G10L 15/187 704/8 |
| 2011/0166859 A1 * | 7/2011 | Suzuki | G10L 15/06 704/246 |
| 2011/0218805 A1 | 9/2011 | Washio et al. | |
| 2012/0203553 A1 * | 8/2012 | Maruta | G10L 13/08 704/243 |
| 2012/0226491 A1 * | 9/2012 | Yamazaki | G10L 15/06 704/8 |
| 2012/0278061 A1 * | 11/2012 | Weinstein | G10L 15/005 704/2 |
| 2013/0238336 A1 * | 9/2013 | Sung | G10L 15/32 704/255 |
| 2014/0129218 A1 * | 5/2014 | Liu | G10L 15/32 704/231 |
| 2014/0149104 A1 * | 5/2014 | Kim | G06F 17/289 704/8 |
| 2015/0112685 A1 * | 4/2015 | Zhang | G10L 15/32 704/257 |

FOREIGN PATENT DOCUMENTS

| | | |
|---|---|---|
| JP | 2001-282788 A | 10/2001 |
| JP | 2005-025024 A | 1/2005 |
| JP | 2005-241833 A | 1/2005 |
| JP | 2009-300573 A | 12/2009 |
| JP | 2011-185997 A | 9/2011 |

* cited by examiner

| Processed Speech Signal of m-th Pattern / Acoustic Model for n-th Language | Recognition Score of Processed Speech Signal of First Pattern | Recognition Score of Processed Speech Signal of Second Pattern | Recognition Score of Processed Speech Signal of Third Pattern | Average Value | Evaluation Value (Threshold Value 400) |
|---|---|---|---|---|---|
| Acoustic Model for First Language | 400 | 430 | 400 | 410 | 3 |
| Acoustic Model for Second Language | 380 | 390 | 400 | 390 | 1 |
| Acoustic Model for Third Language | 380 | 380 | 380 | 380 | 0 |

FIG.6

SPEECH RECOGNITION DEVICE AND SPEECH RECOGNITION METHOD

TECHNICAL FIELD

The present invention relates to a speech recognition device and a speech recognition method that recognize a speech uttered by a user.

BACKGROUND ART

A speech recognition device in recent years is capable of recognizing a plurality of languages. In such a speech recognition device, it is necessary to perform a recognition process by using an acoustic model suitable for a language used by a user such that a recognition rate is increased. For example, even in the case of English, pronunciation of English by a user whose native language is German is different from that by a user whose native language is French, and hence it is necessary to use the acoustic model suitable for each user.

An example of a conventional switching method of a plurality of languages includes a use language switching method of an electronic dictionary device according to Patent Document 1. The electronic dictionary device includes a registration unit that registers a word for each language, a determination unit that determines whether or not a speech uttered by a user matches the word registered in the registration unit, and a switching unit that switches to a dictionary for a language corresponding to the word that the speech has matched. It has been necessary for the user to register the word corresponding to each language in the registration unit in advance and, at the time of switching to the dictionary for a language that the user desires to use, utter the word corresponding to the language.

CITATION LIST

Patent Document

Patent Document 1: Japanese Patent Application Laid-open No. 2001-282788

SUMMARY OF THE INVENTION

Problems to be Solved by the Invention

In the speech recognition device described above, when the method as in, e.g., Patent Document 1 is used in order to switch to the acoustic model suitable for the language used by the user, the user is required to register and utter the word, so that there has been a problem that such operations are irksome for the user.

The present invention has been made in order to solve the above problem, and an object thereof is to provide a speech recognition device and a speech recognition method that automatically switch to a proper acoustic model without requiring a user to perform special operations such as registration and utterance of a word.

Means for Solving the Problems

A speech recognition device of the present invention includes: a speech acquirer that acquires a speech to output the speech as an original speech signal; a speech data processor that processes the original speech signal to generate a processed speech signal; an acoustic analyzer that analyzes the original speech signal and the processed speech signal to generate time series data on an acoustic feature; a plurality of acoustic models corresponding to a plurality of languages each serving as a recognition target; a speech recognizer that converts the time series data on the acoustic feature of the original speech signal into a speech label string of each language by using the acoustic model for each language to generate a determination dictionary for each language, and that performs a recognition process on the time series data on the acoustic feature of the processed speech signal by using the acoustic model and the determination dictionary for each language to calculate a recognition score for each language; and an acoustic model switcher that determines one acoustic model from among the plurality of the acoustic models based on the recognition score for each language calculated by the speech recognizer.

A speech recognition method of the invention includes: processing an original speech signal as a speech in a form of a digital signal to generate a processed speech signal; analyzing the original speech signal and the processed speech signal to generate time series data on an acoustic feature; by using a plurality of acoustic models corresponding to a plurality of languages each serving as a recognition target, converting the time series data on the acoustic feature of the original speech signal into a speech label string of each language to generate a determination dictionary for each language; performing a recognition process on the time series data on the acoustic feature of the processed speech signal by using the acoustic model and the determination dictionary for each language to calculate a recognition score for each language; and determining one acoustic model from among the plurality of the acoustic models based on the recognition score for each language.

Effect of the Invention

According to the present invention, the acoustic model is determined by using the speech uttered freely by a user, and hence it is not necessary for the user to perform special operations such as registration and utterance of a word for switching the acoustic model. Consequently, it is possible to eliminate the irksomeness of the operations. In addition, by performing processing such as superimposition of an environmental noise on the original speech signal, it is possible to determine the acoustic model in consideration of the environmental noise or the like, and prevent switching to an improper acoustic model.

MODES FOR CARRYING OUT THE INVENTION

Hereinbelow, in order to describe the present invention in greater detail, the best mode for carrying out the invention will be described according to the accompanying drawings.

Embodiment 1

Figure 1:
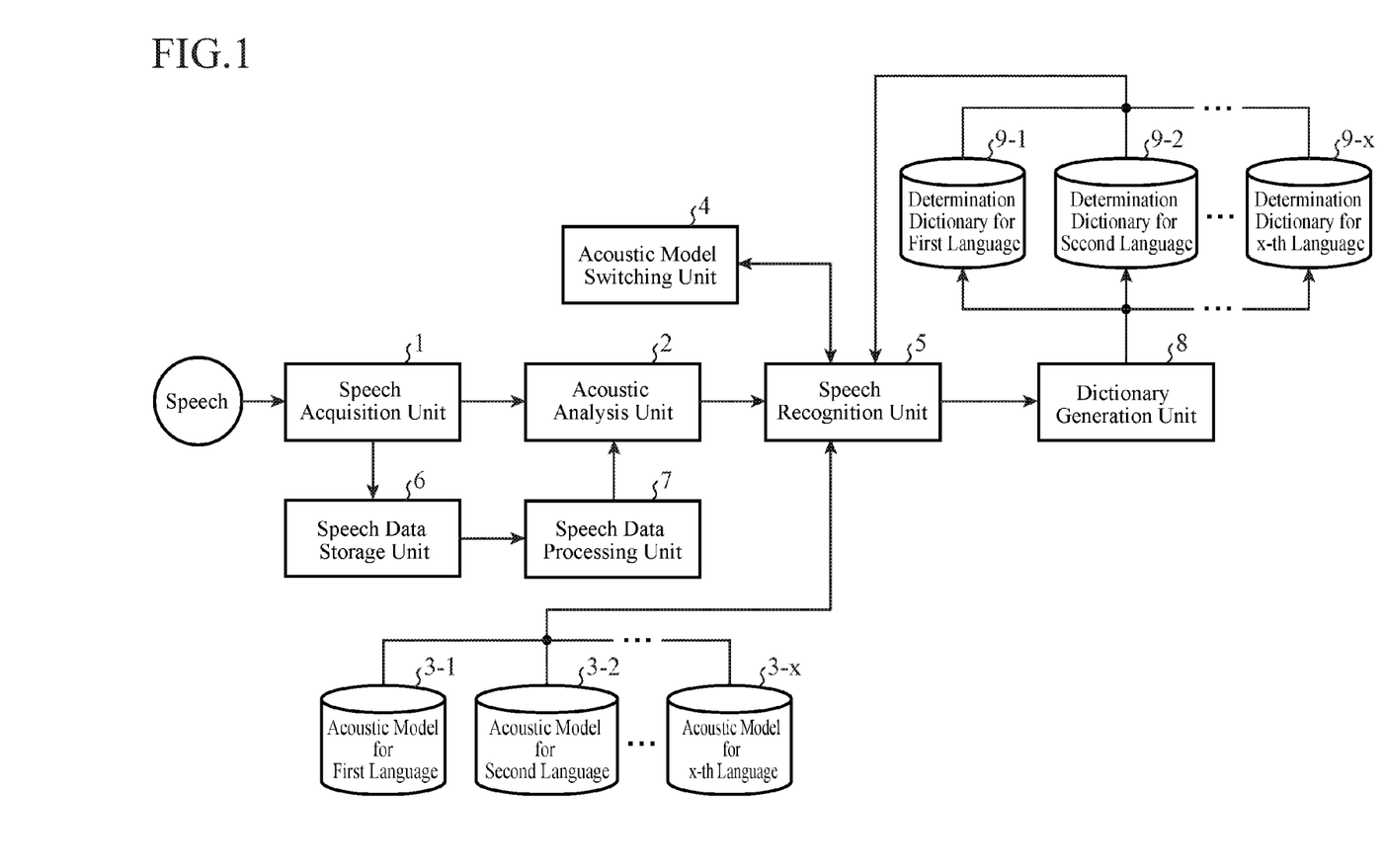
FIG. 1 is a block diagram showing a basic concept of a speech recognition device according to Embodiment 1 of the present invention.

FIG. 1 is a block diagram showing a basic concept of a speech recognition device according to Embodiment 1 of the invention. The speech recognition device includes a speech acquisition unit 1, an acoustic analysis unit 2, acoustic models 3-1 to 3-x (x is any number) prepared for individual languages, an acoustic model switching unit 4, a speech recognition unit 5, a speech data storage unit 6, a speech data processing unit 7, a dictionary generation unit 8, and determination dictionaries 9-1 to 9-x generated for individual languages.

The speech acquisition unit 1 performs A/D (Analog/Digital) conversion on a speech (hereinafter referred to as an original speech) uttered by a user that is inputted from a microphone that is not shown by, e.g., PCM (Pulse Code Modulation) to convert the speech into a digital signal.

Note that, in the following description, a speech signal obtained by converting the original speech into the digital signal is referred to as an original speech signal.

The speech data storage unit 6 stores the original speech signal outputted by the speech acquisition unit 1.

The speech data processing unit 7 acquires the original speech signal from the speech data storage unit 6, and processes the original speech signal to newly generate speech signals of one or more patterns.

Note that, in the following description, such a speech signal that is processed is referred to as a processed speech signal.

An example of the processing method includes superimposition of an environmental noise expected in an environment where the speech recognition device is used, change of volume, change of speed, or a combination thereof, and the processing method may be any method as long as the method does not erase features of an utterance of a user. On the other hand, superimposition of a speech in which a voice of a person is mixed and change of a frequency are avoided.

The acoustic analysis unit 2 analyzes the original speech signal converted into the digital signal by the speech acquisition unit 1 and the processed speech signal generated by the speech data processing unit 7, and converts them into time series data on an acoustic feature.

The acoustic analysis unit 2 analyzes, e.g., the speech signal at constant time intervals, and outputs the time series data on the acoustic feature that represents the feature of the speech (acoustic feature amount vector).

The acoustic models 3-1 to 3-x are standard acoustic features corresponding to speech labels (e.g., phoneme labels) of the first to x-th languages, and the acoustic features are modeled by, e.g., HMM (Hidden Markov Model) or the like.

For example, English uttered by a user whose native language is English is set as the first language, and the acoustic model 3-1 and the determination dictionary 9-1 described later are prepared for the first language. On the other hand, English uttered by a user whose native language is German is set as the second language, and the acoustic model 3-2 and the determination dictionary 9-2 described later are prepared for the second language.

When the acoustic model suitable for the user is determined, the speech recognition unit 5 receives the time series data on the acoustic feature outputted by the acoustic analysis unit 2, checks the time series data with each of the acoustic models 3-1 to 3-x to determine a corresponding speech label string (e.g., a phoneme label string), and outputs the speech label string.

In addition, when the acoustic model suitable for the user is determined, the speech recognition unit 5 receives the time series data on the acoustic feature outputted by the acoustic analysis unit 2, executes a speech recognition process on the time series on the acoustic feature by using the acoustic models 3-1 to 3-x and the determination dictionaries 9-1 to 9-x, and outputs a recognition score as a recognition result.

On the other hand, in a usual speech recognition process, the speech recognition unit 5 receives the time series data on the acoustic feature outputted by the acoustic analysis unit 2, executes the speech recognition process by using any one of the acoustic models 3-1 to 3-x determined by the acoustic model switching unit 4, and outputs the recognition result.

When the acoustic model suitable for the user is determined, the dictionary generation unit 8 stores the phoneme label string outputted by the speech recognition unit 5 in one of the determination dictionaries 9-1 to 9-x for the corresponding language.

For example, in the case where the speech recognition unit 5 checks the time series data on the acoustic feature with the acoustic model 3-1 for the first language, and outputs the corresponding phoneme label string, the dictionary generation unit 8 stores the phoneme label string in the determination dictionary 9-1 for the first language.

Additionally, when the speech recognition unit 5 has the function of the dictionary generation unit 8, the speech recognition unit 5 may be adapted to generate the determination dictionaries 9-1 to 9-x.

The acoustic model switching unit 4 determines the acoustic model suitable for the user who has uttered the original speech from among the acoustic models 3-1 to 3-x based on the recognition result (recognition score) of the processed speech signal subjected to the speech recognition process by the speech recognition unit 5, and notifies the speech recognition unit 5 of the determined acoustic model.

A process for determining the acoustic model by the acoustic model switching unit 4 will be described later.

Note that the speech data storage unit 6, the acoustic models 3-1 to 3-x, and the determination dictionaries 9-1 to 9-x may be stored in a common storage element, a storage device, or the like, and may also be stored in storage elements, storage devices, or the like that are independent of each other.

In addition, the speech recognition device may be configured to have a memory in which a program is stored and a CPU (Central Processing Unit) that executes the program, and functions of the speech acquisition unit 1, the acoustic analysis unit 2, the acoustic model switching unit 4, the speech recognition unit 5, the speech data processing unit 7, and the dictionary generation unit 8 may be implemented using software by execution of the program by the CPU or part thereof may be replaced with hardware.

In addition, the speech recognition device is configured to perform the speech recognition process by a phoneme unit, but it may also be configured to perform the speech recognition process by a unit other than the phoneme.

Figure 3:
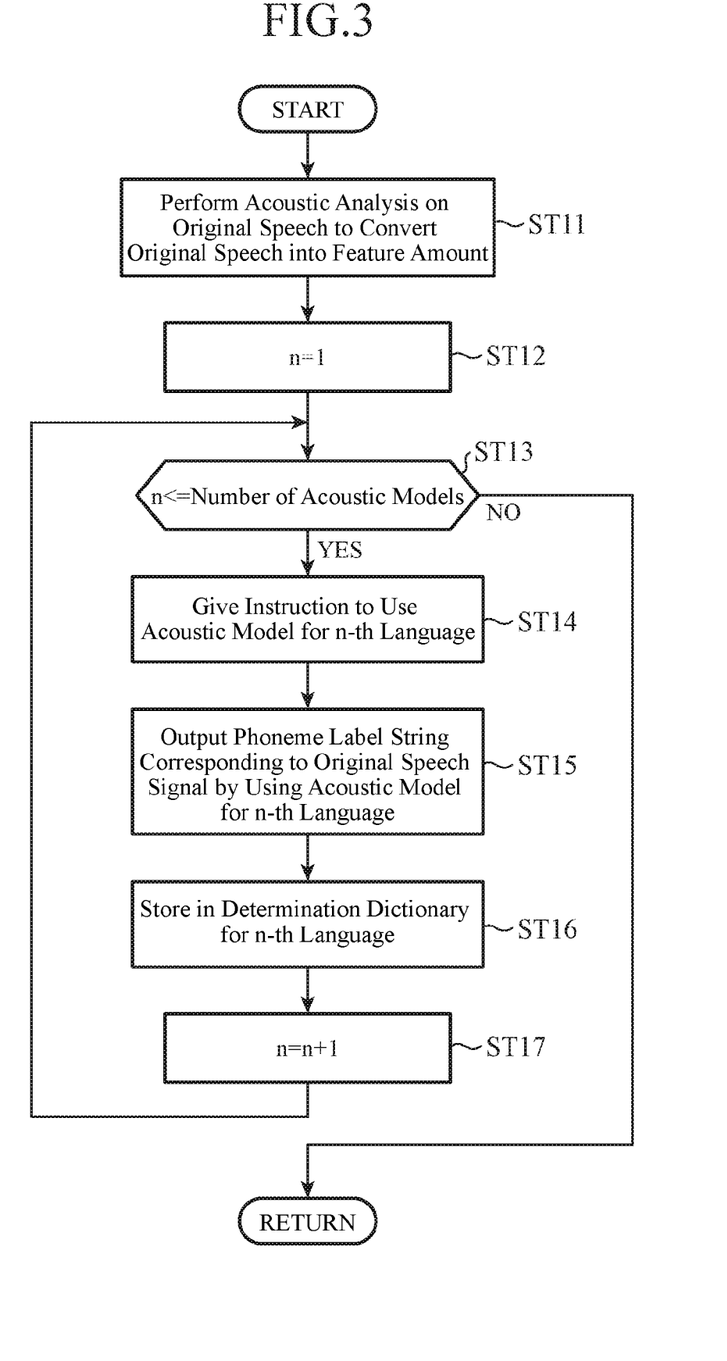
FIG. 3 is a flowchart showing the detail of a process step in Step ST4 of FIG. 2.
Figure 4:
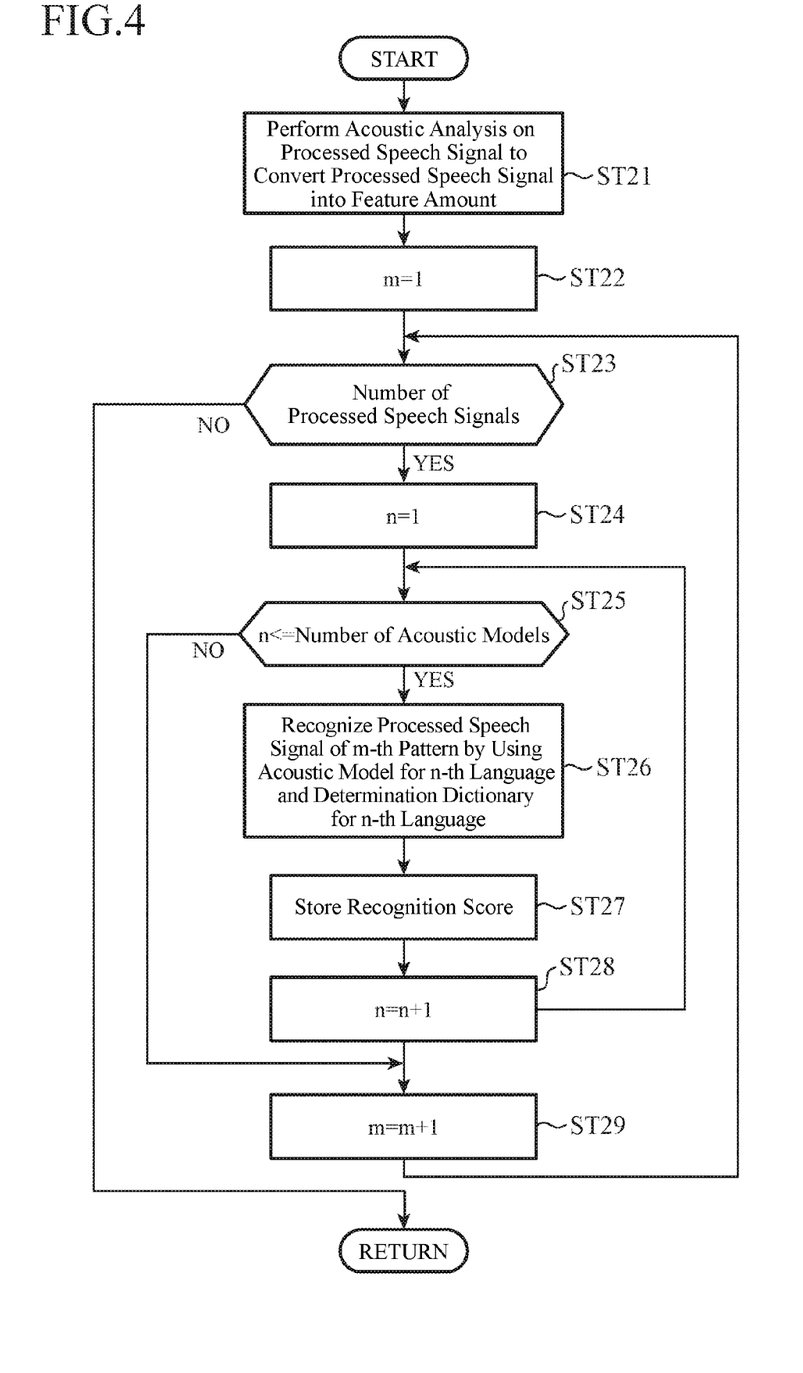
FIG. 4 is a flowchart showing the detail of a process step in Step ST5 of FIG. 2.

Next, the process of the speech recognition device according to Embodiment 1 will be described by using flowcharts shown in FIGS. 2 to 4.

Figure 2:
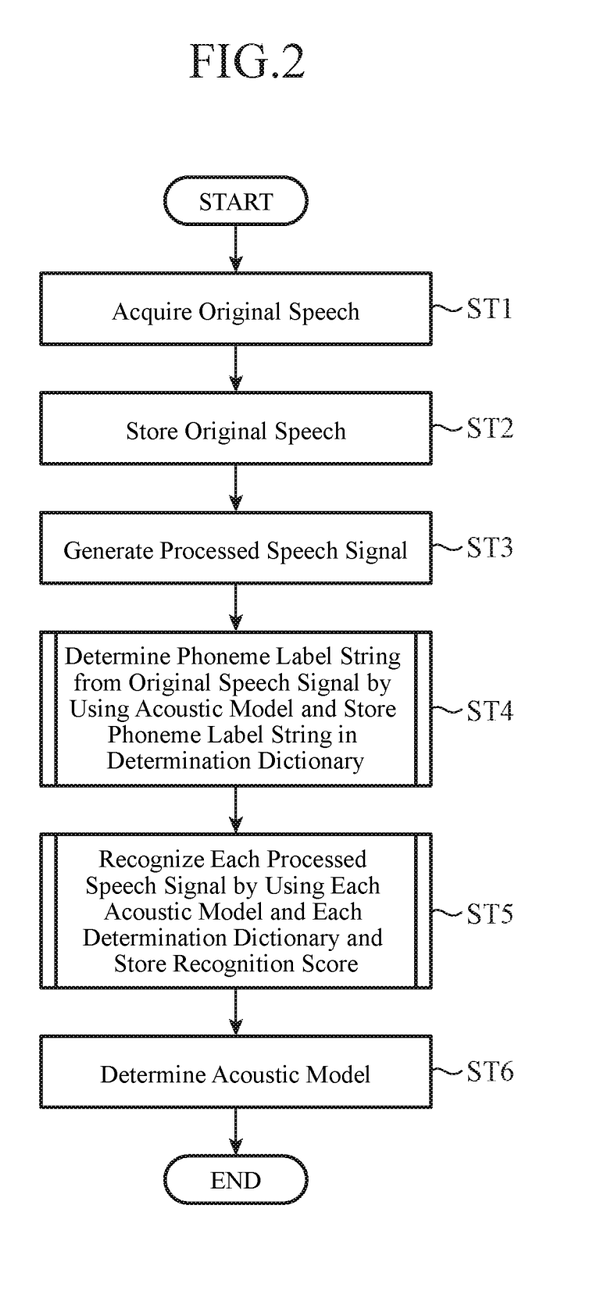
FIG. 2 is a flowchart showing a process for determining an acoustic model suitable for a user in the speech recognition device according to Embodiment 1.

FIG. 2 is a flowchart showing the process for determining the acoustic model suitable for the user.

First, the speech acquisition unit 1 acquires the speech uttered freely by the user as the original speech via a microphone, performs the A/D conversion on the original speech by, e.g., PCM to convert the original speech into the original speech signal (Step ST1), and stores the original speech signal in the speech data storage unit 6 (Step ST2).

Subsequently, the speech data processing unit 7 acquires the original speech signal from the speech data storage unit 6, processes the original speech signal, and newly generates the processed speech signals of one or more patterns (Step ST3).

Thereafter, the acoustic analysis unit 2 analyzes the original speech signal to generate the time series data on the acoustic feature, the speech recognition unit 5 checks the time series data on the acoustic feature with each of the acoustic models 3-1 to 3-$x$ to determine the corresponding phoneme label string, and the dictionary generation unit 8 stores the phoneme label string in one of the determination dictionaries 9-1 to 9-$x$ for the corresponding language (Step ST4).

Here, the detail of the process step in Step ST4 will be described by using a flowchart shown in FIG. 3.

First, the acoustic analysis unit 2 analyzes the original speech signal and converts the original speech signal into the time series data on the acoustic feature (Step ST11).

Subsequently, the acoustic model switching unit 4 initializes a counter n for counting the acoustic models 3-1 to 3-$x$ (Step ST12). Then, in the case where the counter n is not more than the number of acoustic models $x$ (Step ST13 "YES"), the acoustic model switching unit 4 outputs an instruction to the speech recognition unit 5 such that the original speech signal is recognized by using an acoustic model 3-$n$ for the n-th language (Step ST14).

Subsequently, the speech recognition unit 5 checks the time series data on the acoustic feature of the original speech signal outputted by the acoustic analysis unit 2 with the acoustic model 3-$n$ for the n-th language specified by the acoustic model switching unit 4, and outputs the phoneme label string of the n-th language corresponding to the time series on the acoustic feature (Step ST15).

Thereafter, the dictionary generation unit 8 stores the phoneme label string of the n-th language outputted by the speech recognition unit 5 in the determination dictionary 9-$n$ for the n-th language (Step ST16). Subsequently, the acoustic model switching unit 4 increments the counter n (Step ST17), and returns to the process step in Step ST13.

When the process steps in Steps ST13 to ST17 are repeated and the generation of the phoneme label strings of all of the languages for the original speech signal is ended, the acoustic model switching unit 4 determines that the counter n is more than the number of acoustic models $x$ (Step ST13 "NO"), and proceeds to Step ST5 in the flowchart of FIG. 2.

Returning to Step ST5 of FIG. 2, the acoustic analysis unit 2 analyzes each processed speech signal to generate the time series data on the acoustic feature, the speech recognition unit 5 performs the speech recognition process on the time series data on the acoustic feature of each processed speech signal by using the acoustic models 3-1 to 3-$x$ and the corresponding determination dictionaries 9-1 to 9-$x$ to output the recognition score, and the acoustic model switching unit 4 stores each recognition score in association with one of the acoustic models 3-1 to 3-$x$ (Step ST5).

Here, the detail of the process step in Step ST5 will be described by using a flowchart shown in FIG. 4.

First, the acoustic analysis unit 2 analyzes the processed speech signals of a plurality of patterns (e.g., the first to y-th patterns; y is any number) generated from one original speech signal by the speech data processing unit 7, and converts each of the processed speech signals into the time series data on the acoustic feature (Step ST21).

The acoustic model switching unit 4 initializes a counter m for counting the processed speech signals of the first to y-th patterns (Step ST22). Then, in the case where the counter m is not more than the number of processed speech signals y (Step ST23 "YES"), the acoustic model switching unit 4 initializes the counter n for counting the acoustic models 3-1 to 3-$x$ (Step ST24) and, in the case where the counter n is not more than the number of acoustic models (Step ST25 "YES"), the acoustic model switching unit 4 outputs an instruction to the speech recognition unit 5 such that the speech recognition process is performed on the processed speech signal of the m-th pattern by using the acoustic model 3-$n$ and the determination dictionary 9-$n$ for the n-th language. Subsequently, the speech recognition unit 5 receives the time series data on the acoustic feature of the processed speech signal of the m-th pattern, executes the speech recognition process by using the acoustic model 3-$n$ and the determination dictionary 9-$n$ for the n-th language specified by the acoustic model switching unit 4, and outputs the recognition score as the recognition result (Step ST26).

Figure 5:
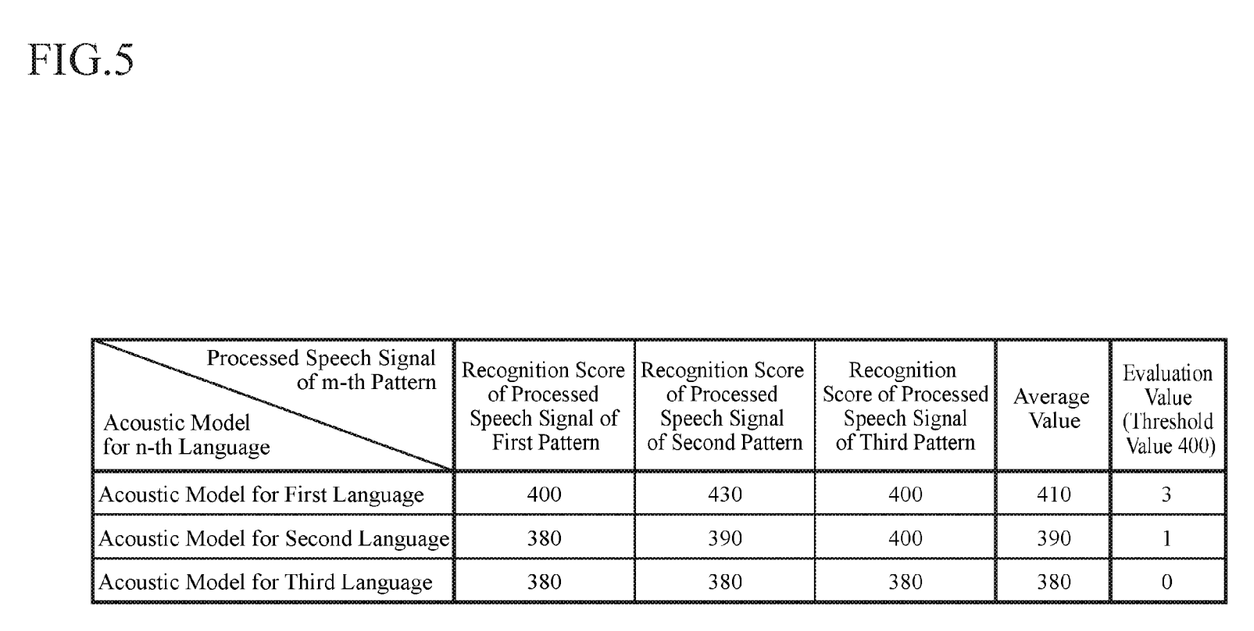
FIG. 5 is a table showing an example of a recognition score determined by the process step in Step ST5 of FIG. 2.

Subsequently, for example, as shown in FIG. 5, the acoustic model switching unit 4 stores the recognition score of the processed speech signal of the m-th pattern outputted by the speech recognition unit 5 in association with the acoustic model 3-$n$ for the n-th language (Step ST27). Then, the acoustic model switching unit 4 increments the counter n (Step ST28), and returns to the process step in Step ST25.

When the process steps in Steps ST25 to ST28 are repeated, and the speech recognition processes of all of the languages for the processed speech signal of the m-th pattern are ended, the acoustic model switching unit 4 determines that the counter n is more than the number of acoustic models (Step ST25 "NO"), increments the counter m (Step ST29), and returns to the process step in Step ST23.

When the process steps in Steps ST23 to ST29 are repeated, and the speech recognition processes of all of the languages for the processed speech signals of all patterns are ended, the acoustic model switching unit 4 determines that the counter m is more than the number of processed speech signals y (Step ST23 "NO"), and proceeds to Step ST6 in the flowchart of FIG. 2.

Returning to Step ST6 of FIG. 2, the acoustic model switching unit 4 determines the acoustic model suitable for the user who has uttered the original speech from among the acoustic models 3-1 to 3-$x$ based on the recognition scores of the processed speech signals of the first to y-th patterns stored in association with the acoustic models 3-1 to 3-$x$ (Step ST6).

The speech recognition unit 5 uses the acoustic model determined by the acoustic model switching unit 4 in the subsequent speech recognition process.

Here, the detail of the process step in Step ST6 will be described by using an example of the recognition score shown in FIG. 5. In FIG. 5, it is assumed that a likelihood between the time series data on the acoustic feature and the acoustic model is higher as the value of the recognition score is higher.

The acoustic model switching unit 4 determines an average value of the recognition scores of the processed speech signals of the first to y-th patterns for each of the acoustic models 3-1 to 3-x, and determines the acoustic model having the largest average value.

Specifically, in the case where the recognition scores when the speech recognition process of the processed speech signal is executed by using the acoustic models 3-1 to 3-x for the first to x-th languages are those shown in FIG. 5, the average value of the recognition scores "400", "430", and "400" of the processed speech signals of the first to third patterns associated with the acoustic model 3-1 for the first language is "410". The average value of the recognition scores of the processed speech signals of the first to third patterns associated with the acoustic model 3-2 for the second language is "390", and the average value of the recognition scores of the processed speech signals of the first to third patterns associated with the acoustic model 3-3 for the third language is "380". Therefore, the acoustic model switching unit 4 determines the acoustic model 3-1 for the first language having the largest average value as the acoustic model suitable for the user.

Alternatively, the acoustic model switching unit 4 determines whether or not the recognition scores of the processed speech signals of the first to y-th patterns are not less than a predetermined threshold value (or more than the threshold value) for each of the acoustic models 3-1 to 3-x, calculates the number of recognition scores that are not less than the threshold value (or more than the threshold value), and uses the number thereof as an evaluation value. Then, the switching unit determines the acoustic model having the largest evaluation value.

Specifically, in the case of the recognition scores shown in FIG. 5, when the threshold value is assumed to be "400", the evaluation value of the acoustic model 3-1 for the first language is "3", the evaluation value of the acoustic model 3-2 for the second language is "1", and the evaluation value of the acoustic model 3-3 for the third language is "0". Therefore, the acoustic model switching unit 4 determines the acoustic model 3-1 for the first language having the largest evaluation value as the acoustic model suitable for the user.

From the above, according to Embodiment 1, the speech recognition device is configured to include: the speech acquisition unit 1 that acquires the speech and outputs the speech as the original speech signal; the speech data processing unit 7 that processes the original speech signal to generate the processed speech signal; the acoustic analysis unit 2 that analyzes the original speech signal and the processed speech signal to generate the time series data on the acoustic feature; the plurality of acoustic models 3-1 to 3-x corresponding to the plurality of languages each serving as a recognition target; the speech recognition unit 5 that converts the time series data on the acoustic feature of the original speech signal into the speech label strings (e.g., phoneme label strings) of the individual languages by using the acoustic models 3-1 to 3-x for the individual languages to generate the determination dictionaries 9-1 to 9-x for the individual languages, and performs the recognition process on the time series data on the acoustic feature of the processed speech signal by using the acoustic models 3-1 to 3-x and the determination dictionaries 9-1 to 9-x for the individual languages to calculate the recognition score for each of the languages; and the acoustic model switching unit 4 that determines one acoustic model from among the plurality of acoustic models 3-1 to 3-x based on the recognition score for each language calculated by the speech recognition unit 5. Accordingly, it becomes possible to determine the acoustic model by using the speech uttered freely by the user, so that it is not necessary for the user to perform special operations such as registration and utterance of a word for switching the acoustic model. Consequently, it is possible to eliminate the irksomeness of the operations. In addition, by performing processing such as superimposition of the environmental noise on the original speech signal, it is possible to determine the acoustic model in consideration of the environmental noise or the like, and prevent switching to an improper acoustic model.

In addition, according to Embodiment 1, it is configured such that the speech data processing unit 7 generates the processed speech signals of the plurality of patterns from one original speech signal, and that the acoustic model switching unit 4 calculates the average value of the plurality of recognition scores corresponding to the processed speech signals of the plurality of patterns for each of the languages, and determines the acoustic model for the language having the largest average value.

Alternatively, it may be configured such that the speech data processing unit 7 generates the processed speech signals of the plurality of patterns from one original speech signal, and that the acoustic model switching unit 4 compares the plurality of recognition scores corresponding to the processed speech signals of the plurality of patterns with the threshold value for each of the languages, and determines the acoustic model for the language having the largest number of recognition scores that are not less than the threshold value (i.e., the largest evaluation value).

By doing so, it is possible to determine the acoustic model that is more suitable for the user.

Note that the acoustic model switching unit 4 in Embodiment 1 receives one original speech signal and determines one average value (or evaluation value) of the recognition scores for each of the acoustic models 3-1 to 3-x, but it is not limited thereto. For example, the acoustic model switching unit 4 may receive a plurality of the original speech signals, perform the process steps in Steps ST4 and ST5 of FIG. 2 a plurality of times, determine a plurality of the average values (or evaluation values) of the recognition scores for one acoustic model, calculate the average value of the plurality of average values (or the average value of the plurality of evaluation values), and determine the acoustic model having the largest average value as the acoustic model suitable for the user.

Further, the acoustic model switching unit 4 may be configured to store the average value (or evaluation value) of the recognition scores of the acoustic models 3-1 to 3-x that are calculated in the past, and when the utterance of the user is newly performed, to calculate the average value (or evaluation value) of the past recognition scores and the average value (or evaluation value) of the recognition scores calculated from the original speech signal of the current utterance of the user to thus determine the acoustic model having the largest average value as the acoustic model suitable for the user.

In addition, in the case where the average value of the past and current average values (or evaluation values) of the recognition scores is calculated, the acoustic model switching unit 4 may weight the average value (or evaluation value) of the recognition scores. For example, the weighting value of the average value (or evaluation value) of the new recognition scores is set to be larger than that of the average value (or evaluation value) of the old recognition scores calculated at an earlier time. Since the voice of a human being changes according to an age or the like, the average value (or evaluation value) of newer recognition scores can be reflected in the acoustic model determination.

By doing so, it is possible to reflect the current physical condition of the user and the current situation of the environmental noise, and hence it is possible to determine the acoustic model that is more suitable for the user.

In addition, according to Embodiment 1, the speech data processing unit 7 is adapted to generate the processed speech signal in which the frequency of the original speech signal is fixed and the volume is changed, and hence it is possible to prevent the feature of utterance of the user from being erased when the original speech signal is processed. Consequently, it is possible to prevent the improper acoustic model for the user from being determined.

Embodiment 2

Figure 6:
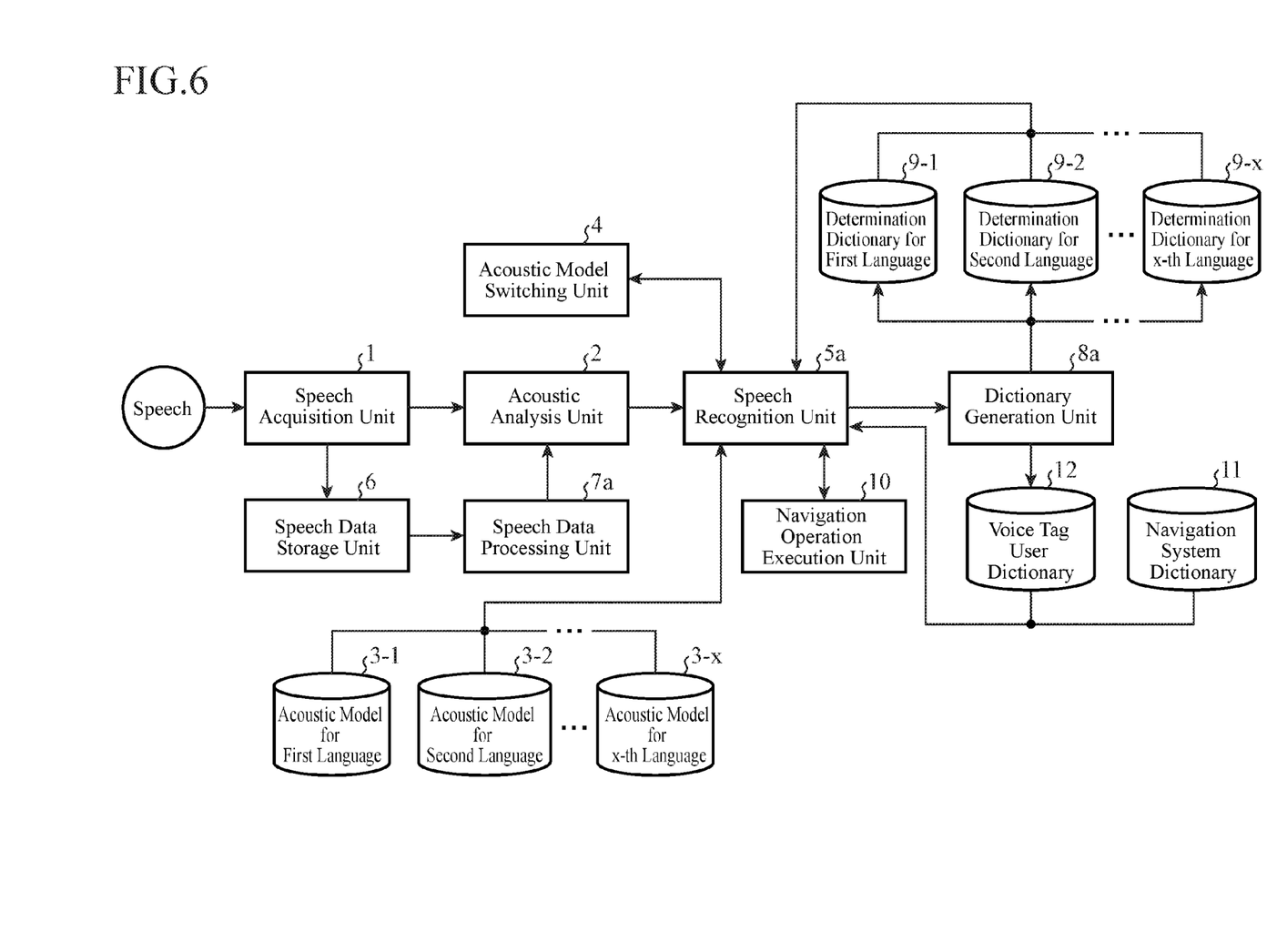
FIG. 6 is a block diagram showing an example of a configuration of a speech recognition device according to Embodiment 2 of the invention.

FIG. 6 is a block diagram showing a configuration of a speech recognition device according to Embodiment 2, and is an example in which the speech recognition device is incorporated into a navigation device mounted in a mobile object such as a vehicle.

The navigation device to which the speech recognition device according to Embodiment 2 is applied includes a navigation operation execution unit 10, a navigation system dictionary 11, and a voice tag user dictionary 12. The navigation operation execution unit 10 detects the position of a vehicle in which the navigation device is mounted and displays the position of the vehicle on a map of a display that is not shown, and performs route guidance from the position of the vehicle to a destination. In the navigation system dictionary 11, a phoneme label string of an operation command associated with a function executed by the navigation operation execution unit 10 is stored.

Note that, in FIG. 6, the same or like components to those of FIG. 1 are designated by the same reference numerals, and description thereof will be omitted.

In addition, the navigation device to which the speech recognition device according to Embodiment 2 is applied includes a function of registering the speech uttered by a user such as a driver as a voice tag in the voice tag user dictionary 12, and using the voice tag as a recognition target word (hereinafter referred to as a user dictionary generation function by the speech). Note that the user dictionary generation function by the speech is not limited to the voice tag, and the function may be appropriately a function having a process for storing the speech uttered by the driver.

Further, in Embodiment 2, the speech when the user dictionary generation function is executed (e.g., voice tag) is used in the acoustic model determination.

Here, the user dictionary generation function by the speech will be described by using the flowchart of FIG. 2.

For example, consideration will be given to the case where an operation command for causing the navigation operation execution unit 10 to execute the route guidance from the position of the vehicle to "home" is registered in the voice tag user dictionary 12 as the voice tag. In this case, when the user utters "home" for registering the voice tag, the speech acquisition unit 1 acquires the speech as the original speech (Step ST1), and stores the original speech in the speech data storage unit 6 (Step ST2).

A speech data processing unit 7a superimposes a noise in a vehicle compartment (e.g., a running noise according to the speed of the vehicle, a windshield wiper sound, a blinker sound, and so on) in addition to the changes of the volume and the speed when the speech data processing unit 7a processes the original speech signal, to thus generate the processed speech signal (Step ST3).

Subsequently, similarly to Embodiment 1, the process steps in Steps ST4, ST5, and ST6 are performed, and the acoustic model switching unit 4 determines the acoustic model suitable for the user from among the acoustic models 3-1 to 3-x. Thus, since the speech uttered by the user for registering the voice tag can be used for the acoustic model determination, it is not necessary for the user to perform a special operation for the acoustic model determination.

Thereafter, a dictionary generation unit 8a registers the phoneme label string corresponding to the original speech signal of "home" that is generated by a speech recognition unit 5a by using the acoustic model determined by the acoustic model switching unit 4 in the voice tag user dictionary 12. Thus, the voice tag "home" serves as the recognition target word.

In the subsequent usual speech recognition process (when the user dictionary generation function by the speech is not executed), in the case where the user has uttered the voice tag (e.g., "home"), the speech recognition unit 5a receives the time series data on the acoustic feature of the voice tag outputted by the acoustic analysis unit 2, executes the speech recognition process by using any one of the acoustic models 3-1 to 3-x determined by the acoustic model switching unit 4 and the voice tag user dictionary 12, and outputs a recognition result to the navigation operation execution unit 10. The navigation operation execution unit 10 executes a predetermined operation command registered in association with the voice tag of the recognition result (e.g., a function of performing the route guidance from the position of the vehicle to "home").

In addition, for example, in the case where the user has uttered a navigation operation command (e.g., a function of changing the scale of the map) in the usual speech recognition process as well, the speech recognition unit 5a receives the time series data on the acoustic feature of the uttered speech, and executes the speech recognition process by using any one of the acoustic models 3-1 to 3-x determined by the acoustic model switching unit 4 and the navigation system dictionary 11. The navigation operation execution unit 10 executes the function registered in association with the recognition result outputted from the speech recognition unit 5a.

From the above, according to Embodiment 2, the speech recognition device is configured to include the dictionary generation unit 8a that registers the speech uttered by the user in the voice tag user dictionary 12 as the recognition target word of the speech recognition unit 5a, and the speech acquisition unit 1 acquires the speech (e.g., voice tag) uttered by the user for registering the speech in the voice tag user dictionary 12, and hence it is not necessary for the user to perform special operations such as the registration of the word and the utterance for switching the acoustic model. Consequently, it is possible to eliminate the irksomeness of the operations.

In addition, according to Embodiment 2, it is configured such that the speech acquisition unit 1 acquires the speech uttered by a vehicle occupant, and that the speech data processing unit 7 generates the processed speech signal in which the noise of the vehicle is superimposed on the original speech signal, and hence it is possible to determine the proper acoustic model in consideration of the noise of the vehicle or the like. Consequently, it is possible to realize the speech recognition device suitable for use in the in-vehicle navigation device or the like.

Note that, in Embodiment 2, the description has been made by taking the case where the speech recognition device is applied to the navigation device mounted in the vehicle as an example, but the speech recognition device may be applied to the navigation device for the mobile object other than the vehicle, or may also be applied to a terminal or a server of a navigation system consisting of the terminal mounted in the mobile object and the server that provides information required for the navigation to the terminal. In addition, it may also be an application program installed in a personal digital assistant in the case where the personal digital assistant such as a smartphone, a tablet PC (personal computer), or a mobile phone is used as the terminal of the navigation device or the navigation system.

In the case where the speech recognition device of Embodiment 2 is applied to the navigation system consisting of the terminal mounted in the mobile object and the server, the terminal may include at least the speech acquisition unit 1 and the server may include the other components, and the original speech signal or the like may be appropriately transmitted from the terminal to the server through wireless communication.

Further, in Embodiment 2, the speech recognition device is applied to the navigation device, but it may also be applied to a radio receiver, a hands-free call device, or the like. In this case, as the user dictionary generation function by the speech, a radio station name corresponding to the frequency of a radio is registered in the form of the speech (e.g., voice tag), or the name of a person or the name of a place corresponding to a telephone number is registered in the form of the speech (e.g., voice tag).

In Embodiments 1 and 2, it is described that the acoustic model and the determination dictionary are prepared for each language, but the unit of preparation of the acoustic model and the determination dictionary is not limited to the language. For example, the acoustic model and the determination dictionary may be separately prepared according to a difference in the accent of a dialect between regions.

It is to be understood that a free combination of the individual embodiments, variations of any components of the individual embodiments, or removal of any components of the individual embodiments is possible within the scope of the invention.

INDUSTRIAL APPLICABILITY

As described above, in the speech recognition device according to the present invention, since the acoustic model is automatically switched based on the speech uttered freely by the user, the speech recognition device is suitable for use as the speech recognition device mounted in a vehicle or the like.

DESCRIPTION OF REFERENCE NUMERALS AND SIGNS

1: speech acquisition unit
2: acoustic analysis unit
3-1 to 3-$x$: acoustic model
4: acoustic model switching unit
5, 5*a*: speech recognition unit
6: speech data storage unit
7, 7*a*: speech data processing unit
8, 8*a*: dictionary generation unit
9-1 to 9-$x$: determination dictionary
10: navigation operation execution unit
11: navigation system dictionary
12: voice tag user dictionary

The invention claimed is:

1. A speech recognition device comprising:
a speech acquirer that acquires a speech to digitize and output the speech as an original speech signal;
a speech data processor that processes the original speech signal to generate a processed speech signal;
an acoustic analyzer that analyzes the original speech signal and the processed speech signal to generate time series data on an acoustic feature;
a plurality of acoustic models corresponding to a plurality of languages each serving as a recognition target;
a speech recognizer that converts the time series data on the acoustic feature of the original speech signal into a speech label string of each language by using the acoustic model for each language to generate a determination dictionary for each language, and that performs a recognition process on the time series data on the acoustic feature of the processed speech signal by using the acoustic model and the determination dictionary for each language to calculate a recognition score for each language; and
an acoustic model switcher that determines one acoustic model from among the plurality of the acoustic models, based on the recognition score for each language calculated by the speech recognizer.

2. The speech recognition device according to claim 1, wherein
the speech data processor generates a plurality of the processed speech signals for one original speech signal, and
the acoustic model switcher calculates an average value of a plurality of the recognition scores corresponding to the plurality of the processed speech signals for each language, and determines the acoustic model for the language having the largest average value.

3. The speech recognition device according to claim 1, wherein
the speech data processor generates a plurality of the processed speech signals for one original speech signal, and
the acoustic model switcher compares for each language a plurality of the recognition scores corresponding to the plurality of the processed speech signals with a threshold value, and determines the acoustic model for the language having the largest number of the recognition scores that are not less than the threshold value.

4. The speech recognition device according to claim 2, wherein
the acoustic model switcher weights for each language the recognition score according to a time when the speech acquirer acquires the original speech signal.

5. The speech recognition device according to claim 3, wherein
the acoustic model switcher weights the recognition score according to a time when the speech acquirer acquires the original speech signal.

6. The speech recognition device according to claim 1, wherein
the speech data processor generates the processed speech signal in which an environmental noise is superimposed on the original speech signal.

7. The speech recognition device according to claim 1, wherein
the speech data processor generates the processed speech signal in which a frequency of the original speech signal is fixed and volume is changed.

8. The speech recognition device according to claim 1, further comprising a dictionary generator that registers a speech uttered by a user in a user dictionary as a recognition target word of the speech recognizer, wherein
the speech acquirer acquires the speech uttered by the user for registering the speech in the user dictionary, and outputs the acquired speech as the original speech signal.

9. The speech recognition device according to claim 1, wherein
the speech acquirer acquires the speech uttered by a vehicle occupant, and
the speech data processor generates the processed speech signal in which a noise of the vehicle is superimposed on the original speech signal.

10. A speech recognition method comprising:
processing an original speech signal, which is a digitized speech, to generate a processed speech signal;
analyzing the original speech signal and the processed speech signal to generate time series data on an acoustic feature;
by using a plurality of acoustic models corresponding to a plurality of languages each serving as a recognition target, converting the time series data on the acoustic feature of the original speech signal into a speech label string of each language to generate a determination dictionary for each language;
performing a recognition process on the time series data on the acoustic feature of the processed speech signal by using the acoustic model and the determination dictionary for each language to calculate a recognition score for each language; and
determining one acoustic model from among the plurality of the acoustic models, based on the recognition score for each language.

* * * * *